(12) United States Patent
Johannsen

(10) Patent No.: US 12,448,065 B2
(45) Date of Patent: Oct. 21, 2025

(54) TRACK JOINT ASSEMBLY HAVING BUSHING STRUCTURED FOR IN-SERVICE TRANSITIONING FROM FIXED TO ROTATING

(71) Applicant: Caterpillar Inc., Peoria, IL (US)

(72) Inventor: Eric James Johannsen, Washington, IL (US)

(73) Assignee: Caterpillar Inc., Peoria, IL (US)

(*) Notice: Subject to any disclaimer, the term of this patent is extended or adjusted under 35 U.S.C. 154(b) by 253 days.

(21) Appl. No.: 17/410,672

(22) Filed: Aug. 24, 2021

(65) Prior Publication Data

US 2023/0068584 A1 Mar. 2, 2023

(51) Int. Cl.
B62D 55/21 (2006.01)
(52) U.S. Cl.
CPC .................. B62D 55/21 (2013.01)
(58) Field of Classification Search
CPC ..................................... B62D 55/21
USPC ....................................... 305/201
See application file for complete search history.

(56) References Cited

U.S. PATENT DOCUMENTS

| | | | | |
|---|---|---|---|---|
| 2,621,981 | A | * | 12/1952 | Schick ............... B62D 55/0887 305/59 |
| 2,988,926 | A | * | 6/1961 | Mazzarins ........... B62D 55/213 305/202 |
| 3,195,962 | A | * | 7/1965 | Hayatian ............ B62D 55/0887 305/202 |
| 4,150,856 | A | | 4/1979 | Hakkenberg et al. |
| 6,270,173 | B1 | * | 8/2001 | Hashimoto ............ B21K 25/00 305/201 |
| 6,565,161 | B2 | | 5/2003 | Anderton |
| 8,991,944 | B2 | | 3/2015 | Hisamatsu |
| 9,359,025 | B2 | * | 6/2016 | Thorson ................. B62D 55/28 |
| 10,065,692 | B2 | * | 9/2018 | Brooks ................... B62D 55/21 |
| 10,458,012 | B2 | | 10/2019 | Steinmetz et al. |
| 10,882,574 | B2 | | 1/2021 | Johannsen |
| 2018/0057082 | A1 | * | 3/2018 | Johannsen ............. B62D 55/14 |

FOREIGN PATENT DOCUMENTS

| | | | |
|---|---|---|---|
| JP | S61184178 | | 8/1986 |
| JP | 2011255415 A | * | 12/2011 |
| JP | 5580875 B2 | * | 8/2014 ............. B62D 55/21 |
| KR | 20100045930 A | * | 5/2010 ............. B62D 55/21 |

(Continued)

OTHER PUBLICATIONS

FatiqueStrengthAnalysisandFatiqueDamageEvaluationofRollerChain_Saito_2018 (Year: 2018).*

(Continued)

*Primary Examiner* — S. Joseph Morano
*Assistant Examiner* — Eva L Comino

(57) ABSTRACT

A track joint assembly in a track-type machine includes a track link having a pin bore and a bushing bore formed therein. A track pin is attached to the track link within the pin bore, and a track bushing is attached to the track link within the bushing bore. The track pin and the track link are attached by way of a tight interference-fit, and the bushing and track link are attached by way of a light interference-fit. Once placed in service, the bushing can commence rotation during track operation to reduce wear and obviate the need for bushing turns during servicing.

21 Claims, 3 Drawing Sheets

(56) References Cited

FOREIGN PATENT DOCUMENTS

| WO | WO-9413525 A1 | * | 6/1994 | ........... B62D 55/092 |
| WO | 2021118801 | | 6/2021 | |
| WO | WO-2021118801 A1 | * | 6/2021 | ............. B62D 55/08 |

OTHER PUBLICATIONS

Saito_Fatique_Strength_Analysis_2018_10_18 (Year: 2018).*
JP2011255415A_Kobayashi_Proquest_Translation_2011_12_22 (Year: 2011).*

* cited by examiner

TRACK JOINT ASSEMBLY HAVING BUSHING STRUCTURED FOR IN-SERVICE TRANSITIONING FROM FIXED TO ROTATING

TECHNICAL FIELD

The present disclosure relates generally to a track system for a machine, and more particularly to a track system where initially fixed track bushings transition to rotating bushings some time after the track system is placed in service.

BACKGROUND

Track-type machines are used across many industries throughout the world including construction, mining, forestry, landfill applications, and many others. In a typical implementation a track formed by a plurality of track links coupled end-to-end forms an endless loop that is advanced about a plurality of rotatable track-contacting elements. Track-type machines typically operate in harsh environments, subjecting components of the track to a variety of types of potentially severe loading as well as wear between and amongst contacting components of the track and substrate materials. As a result, track components wear over time necessitating the need for inspection and regular service.

In typical track systems, track pins couple together parallel track chains of links. Track bushings are positioned upon the track pins and contact rotating components of the track including a drive sprocket and sometimes one or more idlers. The track is typically disassembled for various inspection and servicing activities at prescribed service intervals, or in the event of unexpected failure or performance degradation of components. Certain tracks are equipped with bushings that rotate, distributing wear upon the outer bushing surface more or less uniformly circumferentially around the bushing. Other track systems employ fixed bushings that are pressed into the track links. In fixed-bushing tracks one service activity typically employed is bushing rotation. Since wear in fixed bushing tracks will tend to occur predominantly upon only part of the bushing contacting a drive sprocket, for instance, after a period of field service operation it is generally desirable to turn the bushings 180° to expose less worn bushing material to the processes that cause wear. In most instances, turning the bushings is a labor-intensive process, requiring a technician to work his or her way along a full length of the track, reversing press fits of the bushings into the links, rotating the bushings, and then reassembling the track. Rotating-bushing tracks alleviate the need for bushing turns, but tend to be more expensive, requiring various seals and more complex lubrication strategies. One example rotating bushing track is known from U.S. Pat. No. 8,172,342 B2 to Diekevers et al.

SUMMARY

In one aspect, a track joint assembly includes a track link having a first link strap, a second link strap, a center section between the first link strap and the second link strap, an upper rail surface formed in part upon each of the first link strap, the second link strap, and the center section, and a lower shoe-mounting surface. The track link further includes a pin bore formed in the first link strap, and a bushing bore formed in the second link strap. A track pin is attached to the track link within the pin bore. A bushing is attached to the track link within the bushing bore. A first diametric interference is defined between the track link and the track pin, and a second diametric interference is defined between the track link and the bushing. The first diametric interference is greater than the second diametric interference.

In another aspect, a track link includes an elongate link body having a first link strap, a second link strap, a center section between the first link strap and the second link strap, an upper rail surface formed in part upon each of the first link strap, the second link strap, and the center section, and a lower shoe-mounting surface. The track link further includes a pin bore formed in the first link strap, a bushing bore formed in the second link strap, a first nut seat window and a second nut seat window each longitudinally between the pin bore and the bushing bore. An annular insert includes an insert inner surface defining an insert inner diameter dimension and defining the bushing bore, and an insert outer surface interference-fitted with the elongate link body and defining an insert outer diameter dimension that is from 105% to 110% of the insert inner diameter dimension.

In still another aspect, a track link assembly includes a track link having a first link strap, a second link strap, a center section between the first link strap and the second link strap, an upper rail surface formed in part upon each of the first link strap, the second link strap, and the center section, and a lower shoe-mounting surface. The track link further includes a pin bore within the first link strap extending between an inboard link side and an outboard link side, and a bushing bore within the second link strap extending between the inboard link side and the outboard link side. An annular insert forms the bushing bore and is attached to the track link by way of a tight interference-fit. The track link assembly further includes a bushing having a first bushing end attached to the annular insert by way of a light interference-fit, a second bushing end, and a bushing center section. The annular insert defines an insert outer diameter dimension, and the bushing center section is enlarged in diameter relative to the first bushing end and the second bushing end and defines a center section diameter dimension greater than the insert outer diameter dimension.

In still another aspect, a track bushing assembly includes an elongate bushing body defining a longitudinal bushing axis extending between a first bushing end and a second bushing end, and including a bushing center section enlarged in diameter relative to the first bushing end and the second bushing end, and a pin bore extending longitudinally through the elongate bushing body. The track bushing assembly further includes a first annular insert upon the first bushing end, and a second annular insert upon the second bushing end. Each of the first bushing end and the second bushing end defines a bushing end diameter dimension, and the bushing center section defines a center section diameter dimension that is greater than the bushing end diameter dimension. Each of the first annular insert and the second annular insert defines an insert outer diameter dimension that is less than the bushing center section diameter dimension and from 105% to 110% of the bushing end diameter dimension.

DETAILED DESCRIPTION

Figure 1:
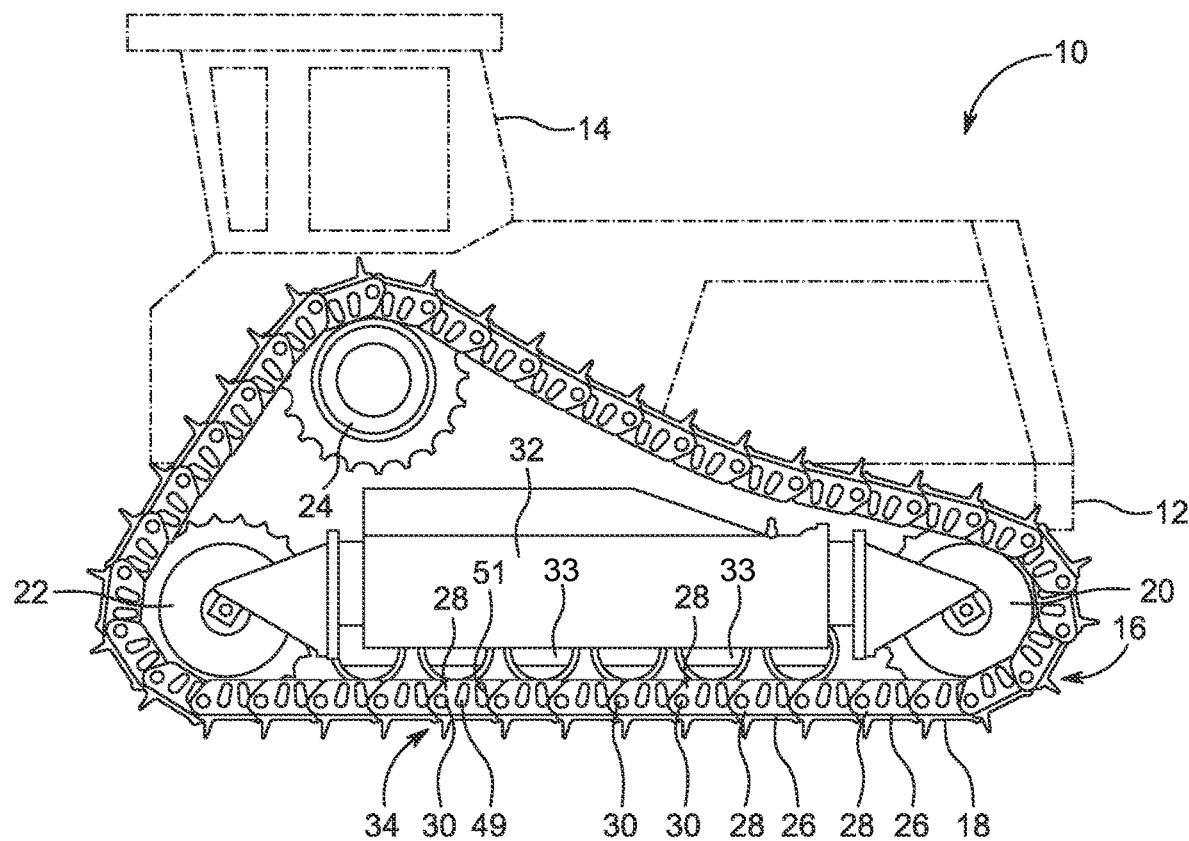
FIG. 1 is a side diagrammatic view of a track-type machine, according to one embodiment.

Referring to FIG. 1, there is shown a track-type machine 10, according to one embodiment. Machine 10 is shown in the context of a track-type tractor suitable for use in any off-highway environment, and having a frame 12 and a cab 14 upon frame 12. A ground-engaging track system 16 supports frame 12 and includes a track 18 upon a first side of machine 10 visible in FIG. 1, and a second, substantially identical track not visible in the illustration. Track system 16 further includes a front idler 20, a back idler 22, and a drive sprocket 24. Drive sprocket 24 is shown in a so-called "high drive" configuration in track system 16. In other embodiments an oval track configuration, or still another, could be employed. In still other instances, rather than an implementation in an off-highway machine, track system 16 could be employed in a conveyor, or still another machinery application. As will be further apparent from the following description, track system 16 is configured for extended field service life and/or reduced servicing labor.

Track 18 includes a plurality of track links 28 coupled together in an end-to-end arrangement to form a loop extending about front idler 20, back idler 22, drive sprocket 24, and a plurality of track rollers 33. Track rollers 33 support a majority of a weight of machine 10 and are mounted to a track roller frame 32 in a generally conventional manner. Track shoes 26 are coupled to track links 28, and a plurality of track pins 30 couple those track links 28 shown in FIG. 1 in a first track chain to a second track chain hidden from view in the illustration.

Figure 2:
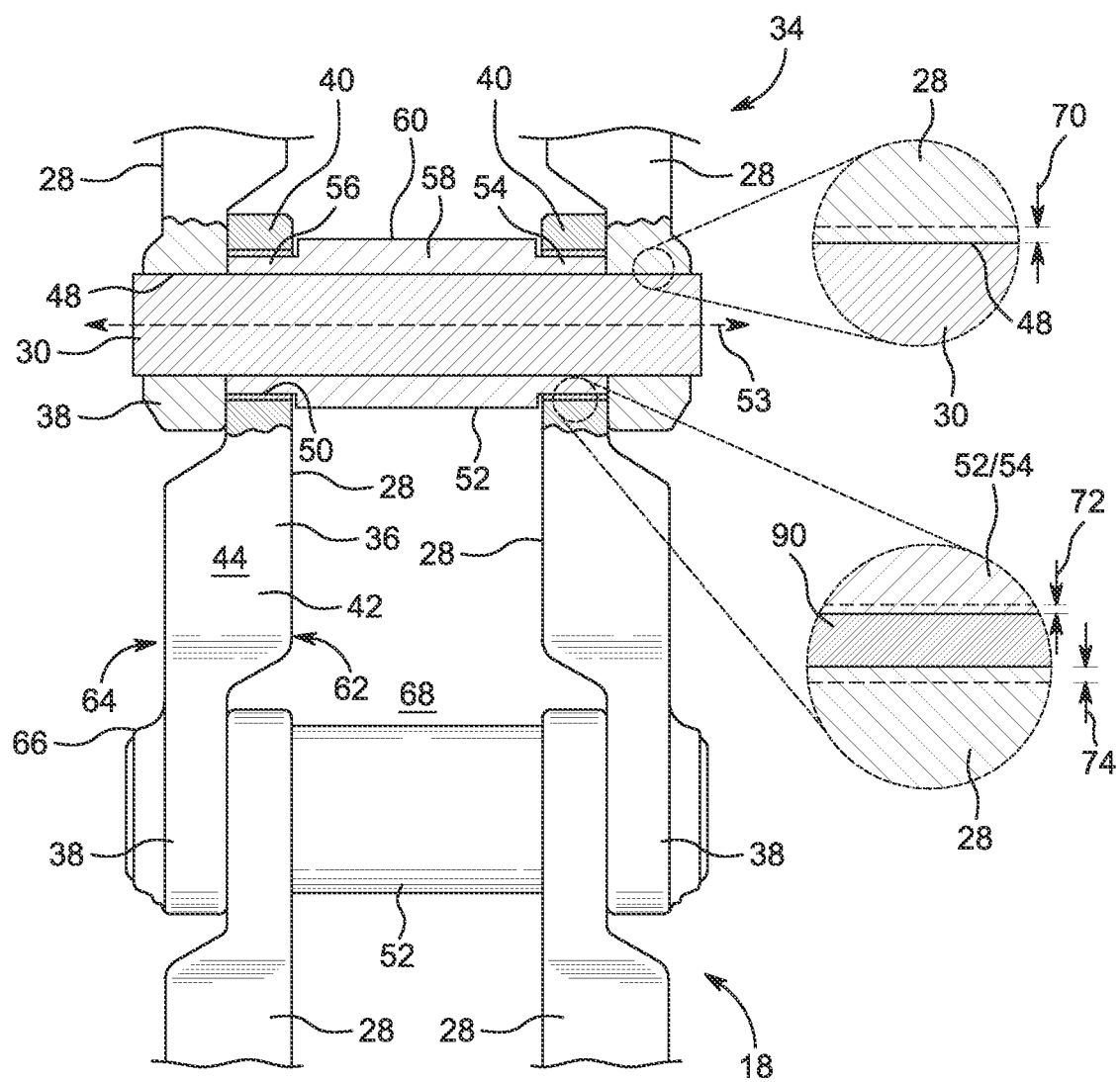
FIG. 2 is a partially sectioned diagrammatic view, in elevation, of a portion of a track, according to one embodiment including detailed enlargements.
Figure 3:
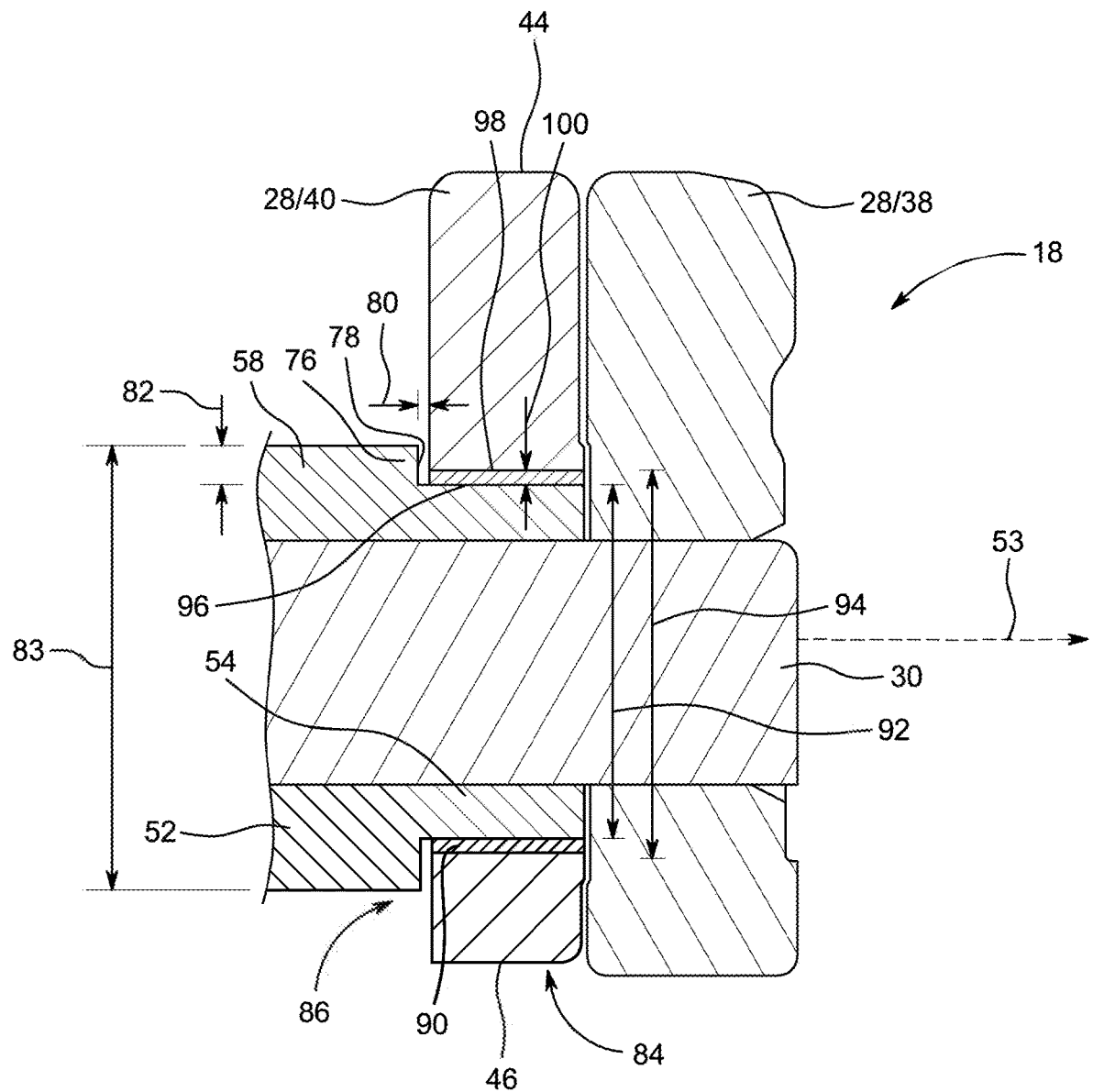
FIG. 3 is a sectioned fore-aft view of a portion of the track of FIG. 2.

Referring also now FIG. 2, there is shown a track joint assembly 34. Track joint assembly 34 includes a track link 28, in the illustrated embodiment a plurality of track links 28, each having an elongate link body 36 having a first link strap 38, a second link strap 40, and a center section 42 between first link strap 38 and second link strap 40. The terms track link and link body are used interchangeably herein. Each track link 28, hereinafter referred to at times in the singular, further includes an upper rail surface 44 formed in part upon each of first link strap 38, second link strap 40, and center section 42. It can be noted from FIG. 2 that track links 28 include a left-handed configuration in the track chain (not numbered) in the left-hand side of the drawing, and a right-handed configuration in the track chain (not numbered) in the right-hand side of the drawing. Left-handed track links as contemplated herein will be arranged such that first link strap 38 is laterally offset in an outboard direction from second link strap 40, whereas the right-handed track links 28 will have a reverse configuration. The term "inboard" means toward a longitudinal centerline of track 18, and "outboard" means a direction away from the longitudinal centerline. In still other embodiments, track links 28 might be straight track links without any lateral offset between the respective link straps. Referring briefly to FIG. 3, track link 28 may further include a lower shoe-mounting surface 46, to which track shoes 26 can be bolted.

As depicted in FIG. 1, track link 28 further includes a first nut seat window 49 and a second nut seat window 51 each longitudinally between a pin bore 48 formed in first link strap 38, and a bushing bore 50 formed in second link strap 40. In a typical implementation bushing bore 50 will be larger in diameter than pin bore 48. Each track link 28 is further understood to include an inboard link side 62, and an outboard link side 64 having a pin boss 66 formed thereon. Pin bore 48, bushing bore 50, and nut seat windows 49 and 51 each extend through track link 28 between inboard link side 62 and outboard link side 64. A track guiding space 68 that receives teeth of drive sprocket 24 during operation extends between adjacent track links 28 in the respective parallel track chains.

As noted above, track pins 30 couple together track links 28. A track pin 30 in track joint assembly 34 is attached to track link 28 within pin bore 48. A bushing 52 defining a longitudinal bushing axis 53 is attached to track link 28 within bushing bore 50. Track pin 30 may be attached to track link 28 by way of a tight interference-fit, whereas bushing 52 may be attached to track link 28 by way of a light interference-fit. The terms "tight" and "light" can be understood herein in relation to one another and in reference to the relative strength of the respective interference fit.

Referring now in particular to the detailed enlargements of FIG. 2, a first diametric interference 70 is defined between track link 28 and track pin 30, and a second diametric interference 72 is defined between track link 28 and bushing 52. Diametric interference refers to a dimensional interference across a full diameter of the respective attached components. Accordingly, in FIG. 2 first diametric interference 70 and second diametric interference 72 are each illustrating one-half of the full diametric interferences that are used. First diametric interference 70 may be greater than second diametric interference 72. Those skilled in the art will appreciate that the larger, tighter first diametric interference 70 provides a stronger interference-fit attachment between the respective components than the smaller, lighter second diametric interference 72 between the respective attached components. This arrangement rigidly and securely attaches track pin 30 to track link 28 while imparting a tendency for bushing 52 to be initially rigidly attached to track link 28, but during service beginning to rotate, at least at times, when subjected to rotational loads about longitudinal bushing axis 53, as further described herein. In a practical implementation strategy, first diametric interference 70 may be greater than second diametric interference 72 by a factor of 4 or greater. In a refinement, first diametric interference 70 is greater than second diametric interference 72 by a factor of 4 to 5. In some embodiments, first diametric interference 70 may be from 0.2 millimeters to 0.5 millimeters, and more particularly from 0.25 millimeters to 0.42 millimeters. Second diametric interference 72 may be from 0.0 millimeters to 0.05 millimeters.

Bushing 52 may further include a bushing body having a first bushing end 54 within one bushing bore 50 in a track link 28, and a second bushing end 56 within another bushing bore in an oppositely positioned track link 28 as depicted in FIG. 2. Bushing 52 may also include a center section 58 enlarged in diameter relative to first bushing end 54 and second bushing end 56. An outer bushing surface 60 structured to contact teeth and pockets of drive sprocket 24 is formed on bushing 52 and extends circumferentially around longitudinal bushing axis 53. A pin bore (not numbered) extends longitudinally through first bushing end 54, bushing center section 58, and second bushing end 56. Referring also to FIG. 3, first bushing end 54 as shown there extends into bushing bore 50, and a shoulder 76 formed by center section 58 adjacent to first bushing end 54 is positioned in facing relation to track link 28. An endplay clearance 78 extends between shoulder 76 and track link 28, and circumferentially around first bushing end 54, as further discussed herein.

The foregoing description focuses on the assembled combination of one track link 28, one track pin 30, and one bushing 52 in track joint assembly 34. Track joint assembly 34 may include additional track links, including a second track link 28 having a second pin bore 48 formed therein, and a second track pin 30 extending through bushing 52 and bushing bore 50 and attaching the second track pin 30 within the second pin bore 48. A "track joint assembly" as contemplated herein could include any number of track links, track pins, track bushings, and related components. Other hardware combinations of components of track 18 could be commercially provided, including as a track link assembly 84 including a track link 28 and a bushing 52, or as bushing assembly 86 of a bushing and one or two annular inserts to be described. In still other instances, a track link 28 could be commercially provided as an individual unit. The present disclosure is to be understood to be applicable to any combination or sub-combination of the various components of track 18.

Track joint assembly 34 may further include an annular insert 90, described herein as part of track link 28, and forming bushing bore 50. Annular insert 90 can be attached with a tight interference-fit to track link 28. Returning focus to FIG. 2, there is shown another diametric interference 74. Diametric interference 74 is a diametric interference between annular insert 90 and track link 28. In a practical implementation strategy, diametric interference 74 can be similar or identical in size to diametric interference 70, although the present disclosure is not thereby limited. Thus, annular insert 90 may be tightly fitted and attached to track link 28, and bushing 52 more lightly fitted and attached to annular insert 90.

In the illustrated embodiment, first bushing end 54 defines a bushing end diameter dimension 92 and annular insert 90 defines an insert outer diameter dimension 94 that is from 105% to 110% of bushing end diameter dimension 92. Insert outer diameter dimension 94 maybe greater than diametric inference 74 by a factor of 60 or greater. Center section 58 defines a center section diameter dimension 83 that is greater than insert outer diameter dimension 94. As can also be seen from FIG. 3, endplay clearance 78 has an axial clearance size 80 in a direction parallel to longitudinal bushing axis 53, and a radial clearance size 82 in a direction normal to longitudinal bushing axis 53. Annular insert 90 further includes an insert inner surface 96 forming bushing bore 50, and an insert outer surface 98. Annular insert 90 defines an insert thickness dimension 100 between insert inner surface 96 and insert outer surface 98. Insert thickness dimension 100 may be greater than a size of endplay clearance 78 between shoulder 76 and track link 28 by a factor of 3 or greater. Insert thickness dimension 100 may be greater than diametric interference 74 by a factor of 15 or less, and in a refinement by a factor from 7 to 15. Annular insert 90 may define an axial length dimension from a first axial end surface to a second axial end surface that is less than outer diameter dimension 94.

INDUSTRIAL APPLICABILITY

From the foregoing description, it will be appreciated that different strategies can be provided for structuring a track link 28, a track joint assembly 34, a track link assembly 84, or a bushing assembly 86 of bushing 52 and one or more annular inserts 90. In the illustrated embodiment, annular insert 90 is used to provide a relatively hard, wear resistant surface within track link 28. In other instances, hardening of material of track link 28 forming bushing bore 50 could be used to analogously provide the desired properties. In still other instances, track link 28 could be through-hardened. Where an annular insert 90 is used, it may be relatively thinner than other inserts used for other purposes in track links and track joint assemblies. Moreover, to facilitate ultimately some rotation of bushing 52, endplay clearance 78 may be provided between shoulder 76 and track link 28. If endplay clearance 78 is too large then too much axial movement between shoulder 76 and track link 28 and/or annular insert 90 may be possible, as well as producing a path for entry of debris. If endplay clearance 78 is too small, then excessive wear may occur. If shoulder 76 is omitted, then undesired axial displacement between bushing 52 and track link 28 may freely occur. Annular insert 90 can include nitrided steel in some embodiments. Other suitable metals and/or hardening processes could be employed. It may also be desirable for other parts of track link 28 to be or left relatively soft rather than hardened. Accordingly, whether a hardened annular insert or hardening of native link body material is used, track link 28 may include a higher hardness material forming bushing bore 50, and a lower hardness material elsewhere, such as a lower hardness material forming pin bore 48.

When track 18 is first placed in service bushings 52 will be fixed to track links 28 and non-rotatable. Over the course of some period of operation, bushings 52 may experience rotational loads such as from the engagement with drive sprocket 24. Accordingly, as wear proceeds upon bushings 52 the commencement of rotation of bushings 52, at least at times, will tend to reorient outer bushing surface 60 so that wear is uniformly, or relatively more uniformly, distributed circumferentially around longitudinal bushing axis 53, eliminating or reducing the need for bushing turns.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A track joint assembly comprising:
a track link including a first link strap, a second link strap, a center section between the first link strap and the second link strap, an upper rail surface formed in part upon each of the first link strap, the second link strap, and the center section, and a lower shoe-mounting surface;
the track link further including a pin bore formed in the first link strap, and a bushing bore formed in the second link strap;
the track link further including an annular insert forming the bushing bore;
a track pin attached to the track link within the pin bore by way of an interference-fit;
a bushing attached to the track link within the bushing bore by way of an interference-fit and non-rotatable relative to the track link, the bushing defining a longitudinal bushing axis;
a first diametric interference is defined between the track link and the track pin at a uniform distance from the longitudinal bushing axis, and a second diametric interference is defined between the track link and the bushing;

the first diametric interference is greater than the second diametric interference; and the annular insert being attached to the elongate link body by way of a tight interference-fit, and the bushing being attached to the annular insert by way of a light interference-fit.

2. The track joint assembly of claim 1 wherein the first diametric interference is greater than the second diametric interference by a factor of 4 or greater.

3. The track joint assembly of claim 2 wherein the first diametric interference is greater than the second diametric interference by a factor of 4 to 5.

4. The track joint assembly of claim 1 wherein the bushing includes a bushing end extending into the bushing bore, and a shoulder adjacent to the bushing end and in facing relation to the track link.

5. The track joint assembly of claim 4 wherein an endplay clearance extends between the shoulder and the track link and circumferentially around the bushing end.

6. The track joint assembly of claim 1 further comprising a second track link having a second pin bore formed therein, and a second track pin extending through the bushing and the bushing bore and attached to the second track link within the second pin bore.

7. The track joint assembly of claim 1 wherein the track link includes a higher hardness material forming the bushing bore, and a lower hardness material.

8. The track joint assembly of claim 7 wherein the annular insert is formed of the higher hardness material.

9. The track joint assembly of claim 8 wherein the bushing includes a bushing end within the bushing bore and defining a bushing end diameter dimension, and the annular insert defines an insert outer diameter dimension that is from 105% to 110% of the bushing end diameter dimension.

10. A track link comprising:
an elongate one-piece link body including a first link strap, a second link strap, a center section between the first link strap and the second link strap, an upper rail surface formed in part upon each of the first link strap, the second link strap, and the center section, and a lower shoe-mounting surface;
the elongate link body further including a pin bore formed in the first link strap, a bushing bore formed in the second link strap, a first nut seat window and a second nut seat window each longitudinally between the pin bore and the bushing bore; and
an annular insert including an insert inner surface defining an insert inner diameter dimension and defining the bushing bore, and an insert outer surface interference-fitted with the elongate link body and defining an insert outer diameter dimension that is from 105% to 110% of the insert inner diameter dimension;
the annular insert defining a center axis and including a first axial end surface facing a first axial direction and a second axial end surface facing a second axial direction;
each of the insert inner surface and the insert outer surface extending from the first axial end surface to the second axial end surface, and each of the insert inner diameter dimension and the insert outer diameter dimension is uniform from the first axial end surface to the second axial end surface; and the annular insert defining an axial length dimension from the first axial end surface to the second axial end surface, and the axial length dimension is less than the outer diameter dimension.

11. The track link of claim 10 wherein:
the annular insert defines an insert thickness dimension between the insert inner surface and the insert outer surface;
a diametric interference is defined between the annular insert and the elongate link body; and
the insert thickness dimension is greater than the diametric interference by a factor of 7 to 15.

12. The track link of claim 10 wherein the annular insert is formed of a higher hardness material, and the elongate link body includes a lower hardness material forming the pin bore.

13. The track link of claim 10 wherein the bushing bore has a larger diameter than a diameter of the pin bore, and the first link strap is laterally offset relative to the second link strap.

14. A track link assembly comprising:
a track link including a first link strap, a second link strap, a center section between the first link strap and the second link strap, an upper rail surface formed in part upon each of the first link strap, the second link strap, and the center section, and a lower shoe-mounting surface;
the track link further including a pin bore within the first link strap extending between an inboard link side and an outboard link side, and a bushing bore within the second link strap extending between the inboard link side and the outboard link side;
the track link further including an elongate link body, and an annular insert forming the bushing bore and attached to the elongate link body by way of a tight interference-fit;
a bushing including a first bushing end attached to the annular insert by way of a light interference-fit such that the bushing is non-rotatable relative to the annular insert, a second bushing end, and a bushing center section; and
the annular insert defining an insert outer diameter dimension, and the bushing center section being enlarged in diameter relative to the first bushing end and the second bushing end and defining a center section diameter dimension greater than the insert outer diameter dimension.

15. The track link assembly of claim 14 wherein the bushing center section forms a shoulder adjacent to the track link, and an endplay clearance is defined between the shoulder and the track link.

16. The track link assembly of claim 15 wherein:
the annular insert includes an insert inner surface forming the bushing bore, and an insert outer surface, and defines an insert thickness dimension between the insert inner surface and the insert outer surface; and
the insert thickness dimension is greater than a size of the endplay clearance between the shoulder and the track link by a factor of 3 or greater.

17. The track link assembly of claim 16 wherein:
a diametric interference is defined between the annular insert and the elongate link body; and
the insert thickness dimension is greater than the diametric interference by a factor of 7 to 15.

18. The track link assembly of claim 14 wherein the first bushing end defines a bushing end diameter dimension, and the annular insert defines an insert outer diameter dimension that is from 105% to 110% of the bushing end diameter dimension.

19. A track bushing assembly comprising:
- an elongate bushing body defining a longitudinal bushing axis extending between a first bushing end and a second bushing end, and including a bushing center section enlarged in diameter relative to the first bushing end and the second bushing end, and a pin bore extending longitudinally through the elongate bushing body;
- a first annular insert upon the first bushing end and attached to the first bushing end by way of an interference-fit such that the first bushing end is non-rotatable relative to the first annular insert;
- a second annular insert upon the second bushing end and attached to the second bushing end by way of an interference-fit such that the second bushing end is non-rotatable relative to the second annular insert;
- each of the first bushing end and the second bushing end defining a bushing end diameter dimension, and the bushing center section defining a center section diameter dimension that is greater than the bushing end diameter dimension;
- each of the first annular insert and the second annular insert defining an insert outer diameter dimension that is less than the bushing center section diameter dimension and from 105% to 110% of the bushing end diameter dimension; and
- each of the first annular insert and the second annular insert is positioned at an endplay clearance from the bushing center section.

20. The track bushing assembly of claim 19 wherein:
- each of the first annular insert and the second annular insert includes an insert inner surface forming the bushing bore, and an insert outer surface, and defines an insert thickness dimension between the respective insert inner surface and insert outer surface; and
- the insert thickness dimension is greater than a size of the endplay clearance by a factor of 3 or greater.

21. The track bushing assembly of claim 19 wherein:
- a diametric interference is defined between each of the first annular insert and the second annular insert and the respective first bushing end and second bushing end; and
- the insert outer diameter dimension is greater than the diametric interference by a factor of 60 or greater.

* * * * *